Fig. 1.

Oct. 8, 1935.  C. A. PURDY  2,016,455
APPARATUS FOR PROCESSING ELECTRICAL DEVICES
Filed Jan. 9, 1930   9 Sheets-Sheet 6

Inventor
Chester A. Purdy
By H. B. Whitfield Atty.

Oct. 8, 1935.    C. A. PURDY    2,016,455
APPARATUS FOR PROCESSING ELECTRICAL DEVICES
Filed Jan. 9, 1930    9 Sheets-Sheet 7

Inventor
Chester A. Purdy
By H. B. Whitfield Att'y.

Oct. 8, 1935.    C. A. PURDY    2,016,455
APPARATUS FOR PROCESSING ELECTRICAL DEVICES
Filed Jan. 9, 1930    9 Sheets-Sheet 8

Inventor
Chester A. Purdy
By H.B. Whitfield Att'y.

Oct. 8, 1935.     C. A. PURDY     2,016,455
APPARATUS FOR PROCESSING ELECTRICAL DEVICES
Filed Jan. 9, 1930     9 Sheets-Sheet 9

Fig. 19.

Inventor
Chester A. Purdy
By J.H.B. Whitfield Att'y.

Patented Oct. 8, 1935

2,016,455

UNITED STATES PATENT OFFICE 2,016,455

APPARATUS FOR PROCESSING ELECTRICAL DEVICES

Chester A. Purdy, Oak Park, Ill., assignor to Western Electric Company, Incorporated, New York, N. Y., a corporation of New York Application January 9, 1930, Serial No. 419,647

37 Claims. (Cl. 209—81)

This invention relates to an apparatus for processing electrical devices, and more particularly to an apparatus for testing and sorting electrostatic condensers.

The principal object of this invention is to provide an efficient, reliable and accurate apparatus for rapidly performing electrical tests on articles.

Another object of the invention is the provision of apparatus responsive in accordance with the properties of the articles being tested for automatically sorting them in accordance with their characteristics.

One embodiment of the invention contemplates the provision of an apparatus for testing and sorting electrostatic condensers wherein the condensers are fed individually by a conveyor and then advanced to an elevating mechanism which moves the individual condensers to a turret where cam actuated levers clamp the terminals of the condensers against contacts through which electrical circuits are successively completed to subject the condensers to a voltage breakdown test, repair voltage, insulation resistance tests, and capacity measurement as the turret intermittently rotates through each of its several positions. The defective condensers are automatically disposed of through separate chutes and the satisfactory condensers are deposited one at a time in a hopper which is moved along a guide rod until one of a series of electrically controlled plungers is projected into the path of the hopper to stop it and deposit the condenser in one of a plurality of magazines according to the particular capacity measurement of that condenser. Reciprocatory advancing members associated with each of the magazines are then simultaneously operated to move the tested and classified condensers a distance sufficient to permit the depositing of succeeding condensers.

The above and other features of the present invention will be set forth in the following description and will be more readily understood by reference to the accompanying drawings, wherein.

Figure 1:
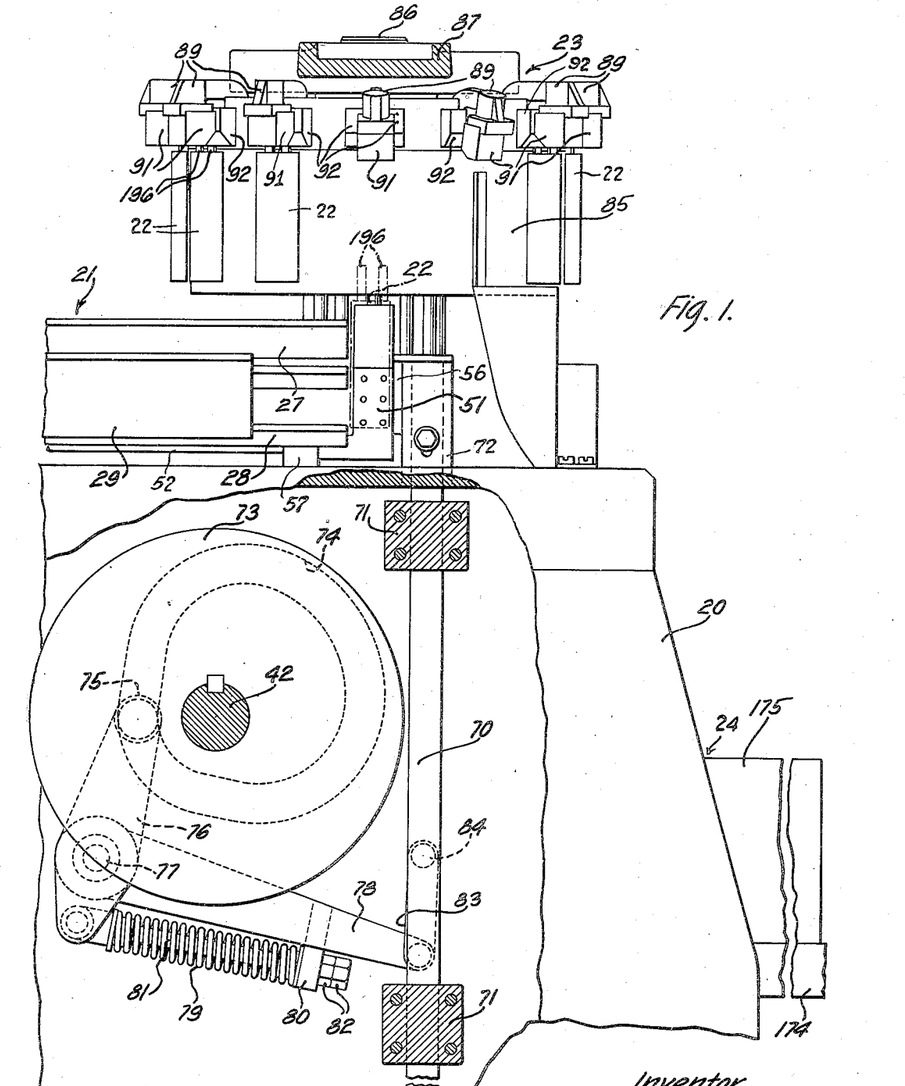
Fig. 1 is a fragmentary view in elevation illustrating the feeding and testing mechanism.
Figure 13:
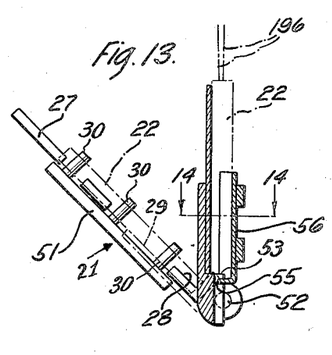
Fig. 13 is a sectional end view of the elevating mechanism taken substantially along the line 13—13 of Fig. 12.
Figure 14:
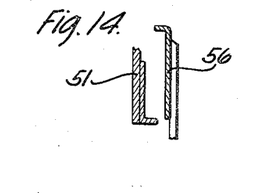
Fig. 14 is a sectional view taken along the line 14—14 of Fig. 13.
Figure 18:
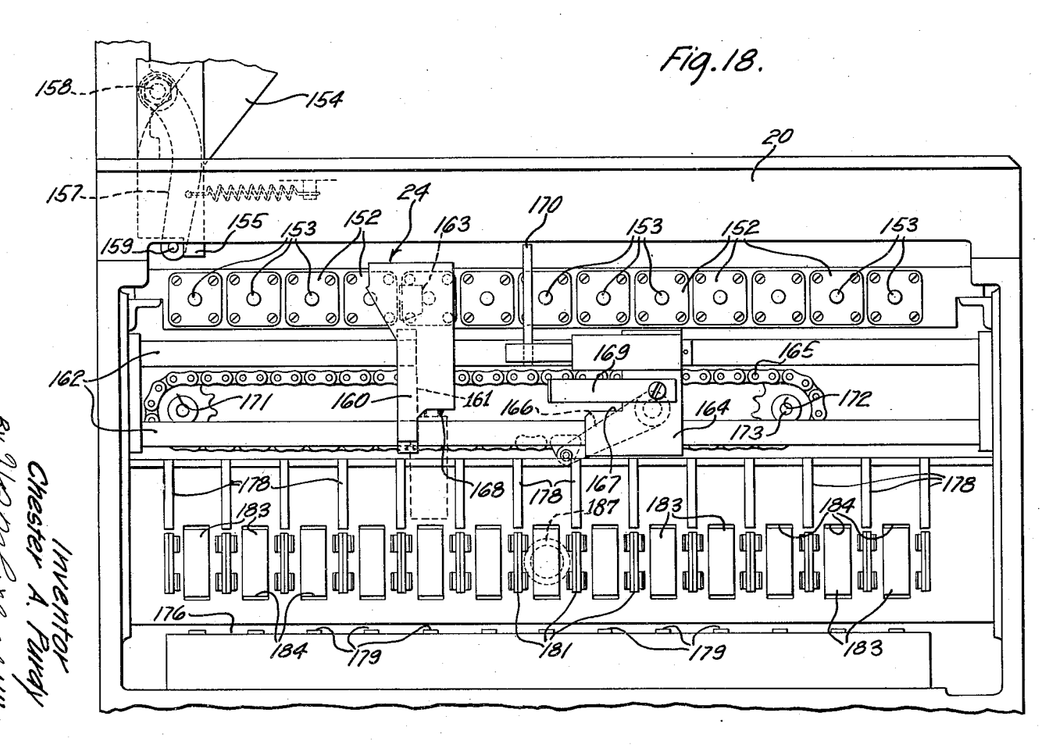
Fig. 18 is a front elevation of the sorting mechanism.

Referring now to the drawings, the numeral 20 indicates generally a housing support for receiving and supporting the actuating mechanism of the apparatus. The apparatus consists generally of a feeding mechanism 21 (Figs. 1 and 7), for moving condensers 22, of the paper foil type, singly to a testing unit 23 (Figs. 1 and 2), where they are received, given a series of tests, and if the condensers withstand or pass these tests, they are transferred to a sorting mechanism 24 (Fig. 18). The feeding mechanism 21 is composed of a feed chute 25 which is supported at an angle by a bracket 26, the latter being mounted upon the support 20. The condensers 22 may be disposed in the chute 25 manually, or by any suitable means (not shown). A stationary rack 27 which has spaced apart longitudinally extending members, one of which is angular in cross section as illustrated at 28 in Fig. 13 is disposed adjacent the lower end of the chute 25 that extends at right angles with respect thereto. A movable rack 29 which is provided with spaced apart rows of condenser engaging pins 30 and spaced apart retaining strips or members 31 is arranged to be disposed adjacent the stationary rack 27 so that the pins 30 together with the retaining members 31 may extend through the elongated openings in the stationary rack 27 which are formed by the spaced elongated strips or supporting members. The movable rack 29 is supported by arms 32 which are rigidly mounted upon a square reciprocating and rotating shaft 33.

Figure 4:
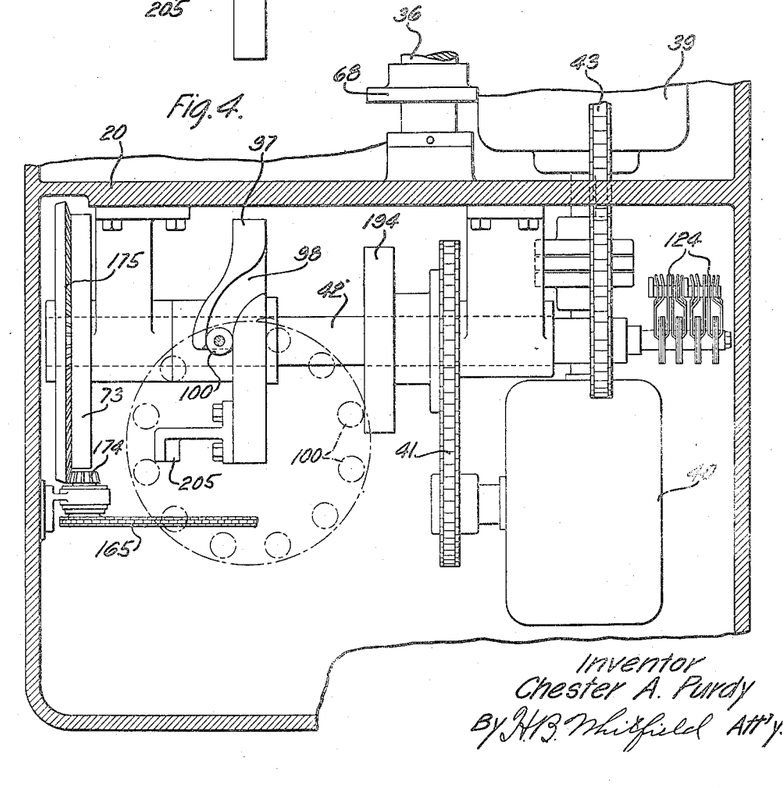
Fig. 4 is a horizontal sectional view showing the power means, together with a portion of the actuating mechanism.
Figure 15:
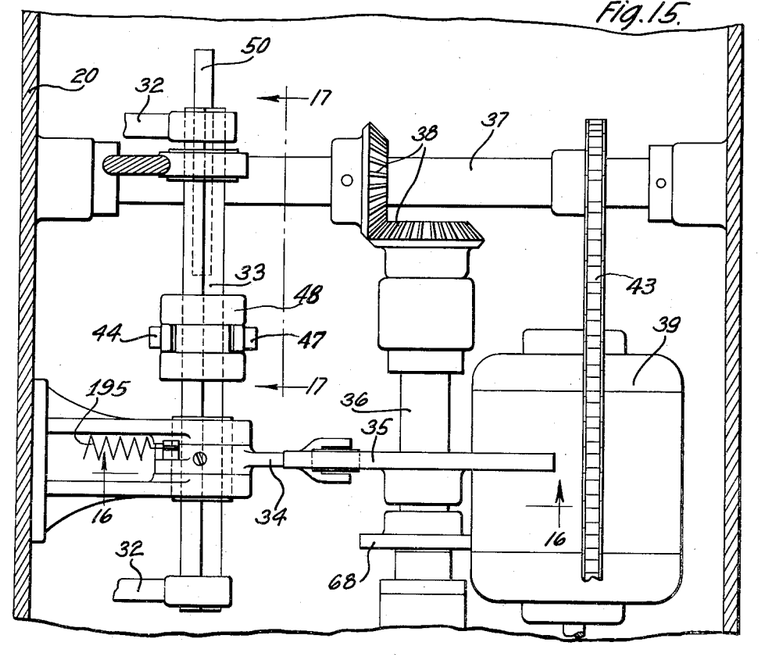
Fig. 15 is a top plan view of the feeding mechanism actuating means, portions thereof being shown in section.
Figures 16, 17:
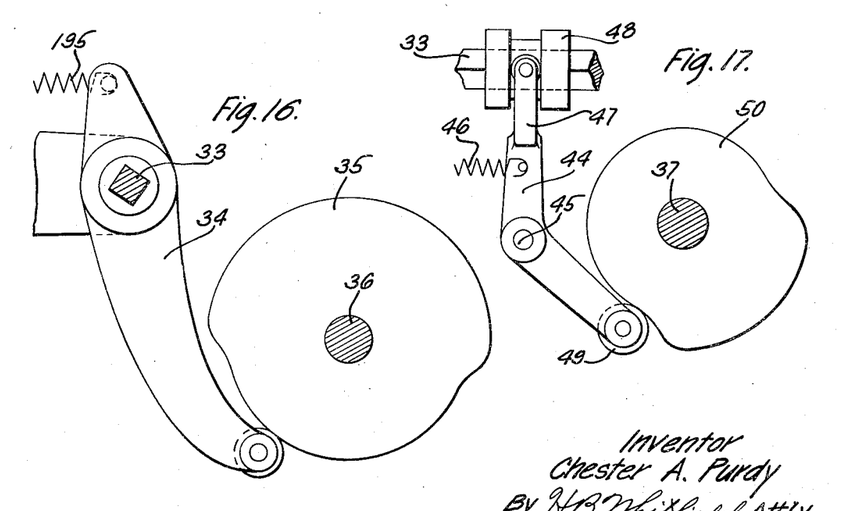
Fig. 16 is a detailed view of the rocking means for the feeding mechanism.
Fig. 17 is a detailed view of the longitudinally moving means for the feeding mechanism.

The rotating or rocking movement of the shaft 33 is caused by the engagement of the cam actuating lever 34 which is mounted upon the shaft 33, with a rocking cam 35 through a cam roller which is rotatably carried by the end of the lever 34. The rocking cam 35 (Fig. 16) is rigidly mounted upon a shaft 36 (Fig. 15) which is rotated due to its operative connection with a shaft 37 through bevel gears 38, the shaft 37 in turn being driven by a motor 39, (Fig. 4) through a speed reducer 40, and its operative connection with the shaft 37 through a chain connection 41 to a drive shaft 42 and a chain connection 43 between the shafts 42 and 37. A longitudinal movement of the square shaft 33 is brought about by the movement of a lever 44 about its pivot 45 against the tension of a spring 46. One end of the lever 44 is provided with a yoke 47 which engages with a collar 48 that is mounted upon the shaft 33. The opposite end of the lever 44 is provided with a cam roller 49 which is held in engagement with an actuating cam 50, mounted upon the shaft 37, by means of the spring 46.

Figure 7:
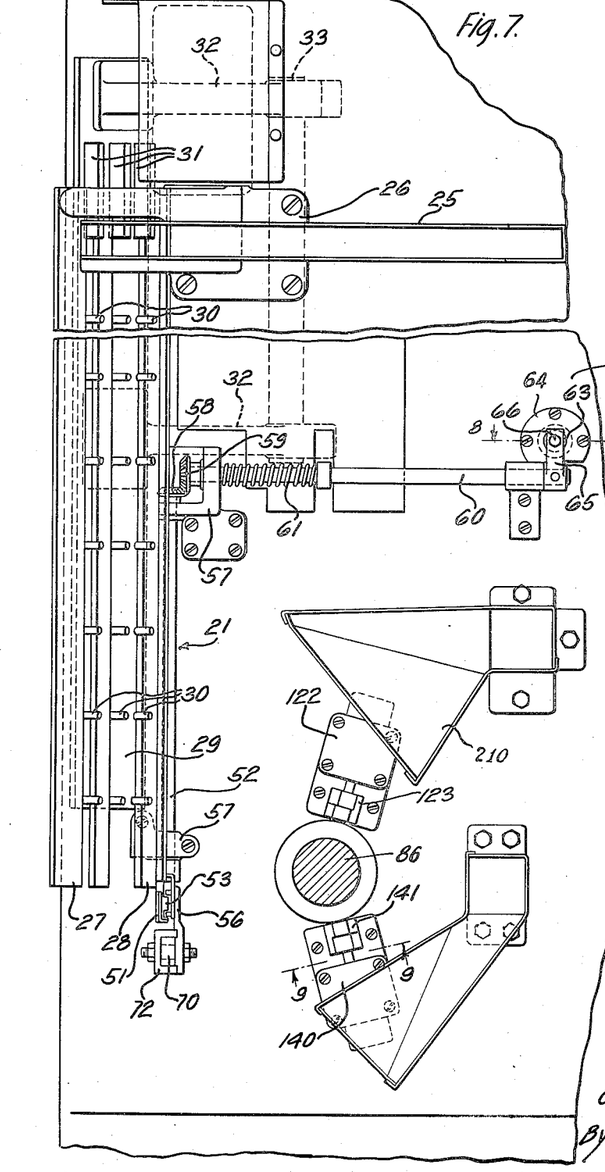
Fig. 7 is a fragmentary top plan view of the apparatus with the testing unit removed.
Figure 8:
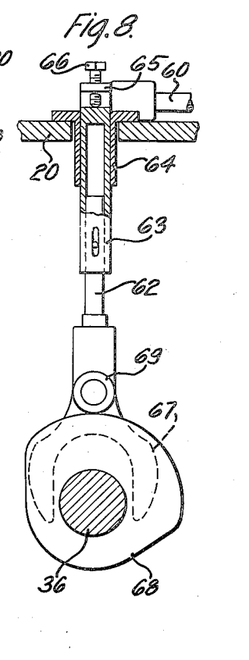
Fig. 8 is a detailed view of a portion of the condenser elevating mechanism taken along the line 8—8 of Fig. 7.

An elevating mechanism is disposed at the free end of the stationary rack 27 and consists of a swinging or moving member 51 which is mounted upon a shaft 52. A supporting member 53 is arranged to receive a condenser and has spaced recesses 54 which are arranged to receive inwardly extending lifting fingers 55 of an elevating member 56. The shaft 52 is rotatably mounted in suitable bearings indicated at 57 and is provided at one end with a beveled gear 58 which is in mesh with a beveled gear 59 of a rocking shaft 60. The shaft 60 is normally held in a position whereby the moving member 51 will be disposed in a receiving position adjacent the stationary rack 27 by means of a helical spring 61 which is disposed concentric with the shaft. A means for rocking the shaft 60 for imparting movement to the swinging member 51 is shown in Figs. 7 and 8 and consists of a push rod 62 movable vertically in a sleeve 63 which extends through a collar 64 carried by the support 20. Engagement is had between the shaft 60 and the sleeve 63 by means of an arm 65, which is rigidly mounted upon the shaft 60, and also by an adjusting screw or member 66 carried thereby, due to the tension of the spring 61. The opposite end of the push rod 62 is provided with a yoke 67 which is adapted to straddle the shaft 36 adjacent a lifting cam 68, the latter being rigidly mounted upon shaft 36 and arranged to engage with a cam roller 69 which is rotatably carried by the shank of the yoke 67.

The elevating mechanism is shown in Figs. 1, 12, 13 and 14, and consists of a vertically movable rod 70, which is movably disposed in bearing members 71 and which has secured to the upper end thereof the elevating member 56 by means of an adjustable sleeve 72. Movement is imparted to the rod 70 through a cam 73 which is mounted upon the shaft 42 and which is provided with a cam groove 74 arranged to receive a cam roller 75. The cam roller 75 is mounted upon one end of the cam lever 76 which is pivotally mounted at 77 and which is operatively connected to a lifting lever 78 through a compression spring 79, one end of which abuts a lug 80 upon the lever 78 while the other end is disposed adjacent the lever 76. The spring 79 is disposed concentric with a rod 81 which has lock nuts 82 disposed upon one end thereof for the purpose of adjusting its compression. A link 83 having one end pivotally mounted at 84 upon the lifting rod 70 and the other end pivotally secured to the free end of the lever 78 operatively connects the lever 78 with the lifting rod 70.

The testing unit 23 (Figs. 1, 2 and 3) consists of a turret 85 which is positioned above the housing support 20 and which is mounted upon an intermittent moving shaft 86 supported at its upper end by a bracket 87 and at its lower end by a bearing 88 positioned in the support 20. A plurality of clamping levers 89 are disposed radially at equally spaced positions about the periphery of the turret and are pivotally mounted at 90. The levers 89 are provided at their outer ends with insulating blocks 91 which are arranged to be moved in close engagement with contact blocks 92 for a purpose hereinafter described. The inner ends of the levers 89 are provided with yoke portions 93 arranged to straddle pins 94 of knockout rods 95. The rods 95 are normally held in their downward positions, and the levers 89 are in like manner held in their closed positions, wherein the insulating blocks 91 are disposed in close proximity to the contact blocks 92, by means of compression springs 96.

A means is employed for imparting an intermittent motion to the shaft 86 and in turn to the turret 85. This means consists of a slotted cam 97 which is mounted upon the shaft 42 and which is provided with a roller receiving slot 98. A roller wheel or disk 99 is keyed to the lower end of the shaft 86 and has disposed at its periphery equally spaced rollers 100 arranged to be received in the slot 98 of the cam 97.

Figure 19:
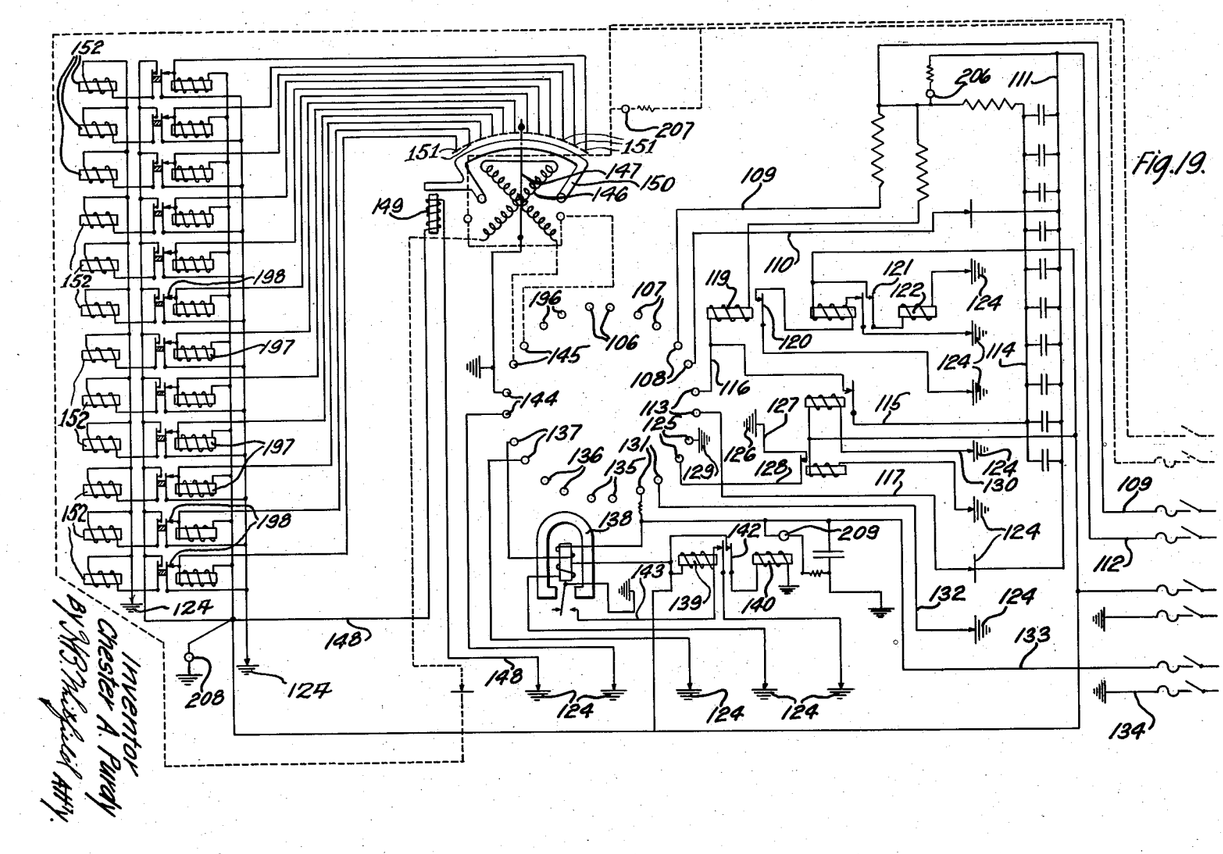
Fig. 19 is a wiring diagram illustrating the invention.

The electric circuits for the testing unit are illustrated in the wiring diagram in Fig. 19. The pairs of small circles which are disposed at equally spaced positions and in circular arrangement in the center of the diagram indicate the positions into which the condensers 22 are intermittently moved during the operation of the apparatus. The condensers are loaded or received by the turret at 106 and are intermittently moved past the position 107 to the position 108 so as to allow sufficient time for the other parts of the apparatus to function. The position 107 may, however, be employed for desired tests. While at position 108, a circuit is closed for applying a potential of 500 volts to the condenser as a breakdown test. This circuit is illustrated by the conductors 109, 110, 111 and the conductor 112. The condenser is then moved to the position 113 where a repair potential of 500 volts is applied through a circuit which is closed intermittently permitting the entire charge of a plurality of condensers 114 to pass through the conductors 115 and 116 through the condenser being tested and back to the condensers 114 though a conductor 117. The intermittent subjection of the condenser to a repair potential of the same voltage previously applied thereto will build up or repair the electrical condition of the condenser if the condenser should not be capable of retaining the previous charge. If the condenser does not break down during the breakdown test, that is, during the applying of the first potential of 500 volts, at position 108, the intermittent charges during the applying of the repair voltage will not be received thereby, and will not pass through a breakdown rejecting circuit including conductor 116, to reject the condenser as hereinafter described. Furthermore, if the condenser should not retain the first charge of 500 volts at position 108 but should become repaired during the application of the repair voltage at position 113, it will be moved to position 125. However, if the condenser should be defective to the extent that it can not be repaired at position 113, the condenser will allow current to flow therethrough from the condensers 114 of the repair voltage circuit, which includes the conductors 115, 116 and 117 and through a relay which may be termed as the breakdown rejecting relay 119 disposed in a breakdown rejecting circuit, will be energized intermittently by the current passing through the defective condenser under test during the intermittent application of the repair voltage. During the energization of the breakdown rejecting relay 119 a circuit is closed at 120 for closing a double switch 121 for energizing a cam actuating solenoid 122. The relative position of the solenoid 122 is shown in Fig. 7 and it is arranged to move the knockout cam 123 into the path of the knockout rods 95 (Fig. 3) for a purpose hereinafter described.

It will be noted that some of the circuits are completed by ground connections as indicated in Fig. 19 which represent sequence switches 124 (Fig. 4) of an interrupter which are so arranged that the proper contacts will be made and retained a predetermined length of time during the intermittent movement of the turret. The interrupter is well known in the art and need not be specifically embodied in the description. It is believed that it is unnecessary and that it would unduly complicate the specification to describe the timing of the sequence switches 124 in detail. These switches are timed in an obvious manner to obtain the results herein described. For example, the switch connected with the contact 120 is not closed until after the intermittent application of high voltage to the condenser at position 113 has been completed. Also for the sake of simplicity no attempt has been made to show which relay contacts will be closed and which opened at any particular instant in the operation of the machine.

If the condenser stands the test submitted to it at the positions 108 and 113, it is passed on to position 125 where it is submitted to a discharge from the ground 126 through conductors 127 and 128 and back to ground at 129. This discharge circuit is closed by a discharge relay circuit 130 and completes the breakdown test.

Figure 9:
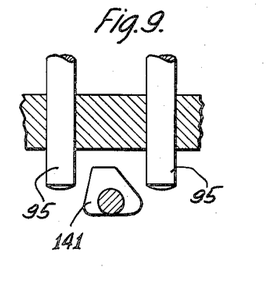
Fig. 9 is a fragmentary detailed view of one of the knockout cams taken along the line 9—9 of Fig. 7.

The condenser is next submitted to an insulation resistance test when it is moved into the position 131 in which position the circuit is closed for applying a potential of 110 volts to the condenser through conductors 132, 133 and 134. This charge of 110 volts is allowed a sufficient length of time to leak from the condenser being tested due to any defect in insulation, as it is passed through positions 135, 136 to position 137. If there has been a leakage in the condenser during the length of time in which the condenser was moved from position 131 to position 137 and this leakage has been sufficient to allow the re-application of 110 volts to energize a relay 138, an insulation resistance knockout control circuit 139 will be closed for energizing an insulation resistance knockout solenoid 140. This solenoid is shown in Fig. 7 and is arranged to move a knockout cam 141 in the path of the knockout rod 95 as shown in Figs. 7 and 9. The circuit 139 is composed of a double switch 142 which not only closes the circuit for the solenoid 140, but closes the circuit 143 for resetting the relay 138. If the condenser being tested passes the insulation resistance test, that is, if the insulation is not defective and the condenser retains its charge of 110 volts, it is then connected to a discharge circuit at the position 144, where the condenser is discharged.

Figure 2:
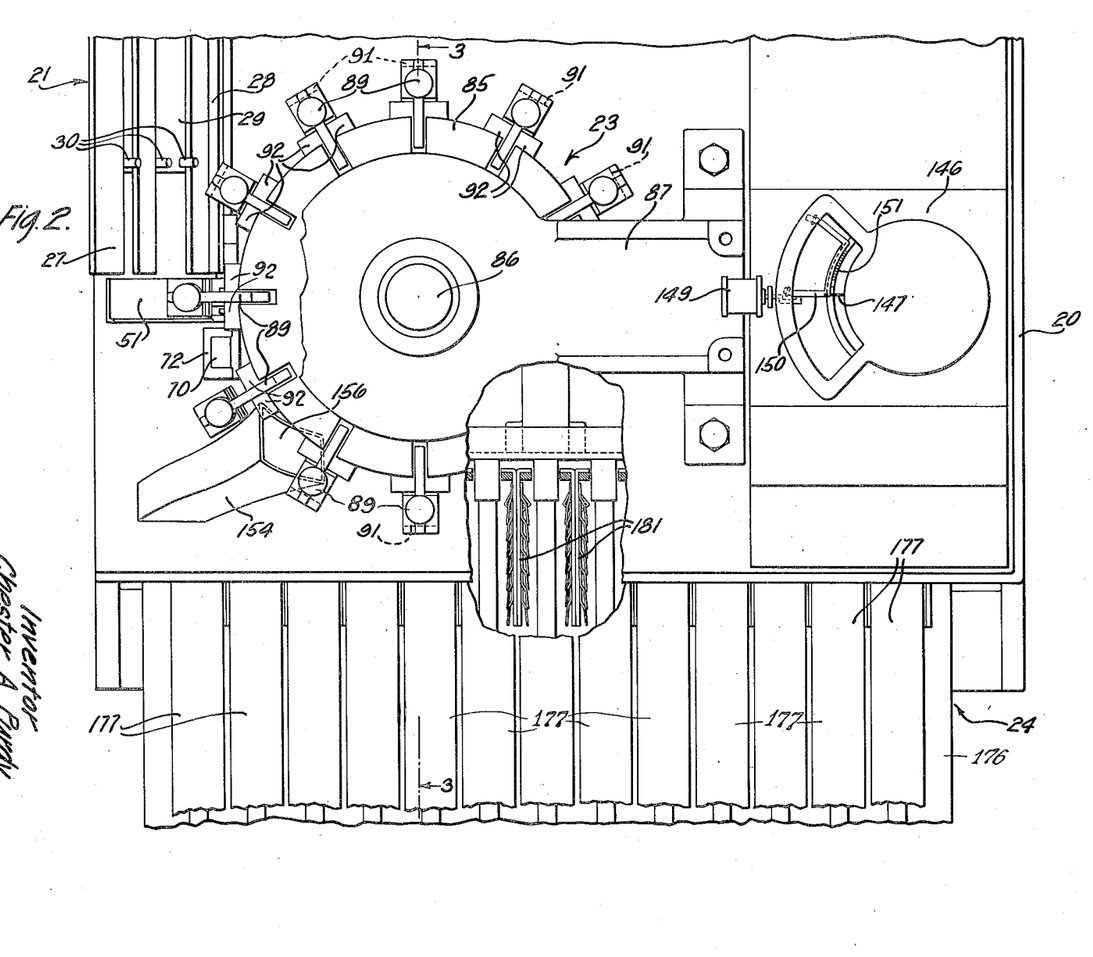
Fig. 2 is a fragmentary top plan view of the apparatus.

The condenser is next submitted to a capacity test at the position 145. At this position a circuit is closed for applying current to a microfarad meter 146 causing the pointer 147 of the meter to be actuated dependent upon the capacity of the condenser being tested. A meter contactor circuit 148 is then closed for energizing a relay 149 (Fig. 2) which actuates a contactor 150 for depressing the pointer 147 into contact with an adjacent segment 151, a plurality of which is provided (Figs. 2 and 19). This engagement of the pointer 147 with one of the segments 151 will close a circuit for energizing one of a plurality of plunger actuating solenoids 152 (Figs. 18 and 19) for a purpose hereinafter described. The capacity test will be more thoroughly described after the detailed structure employed in this test is specifically defined.

Figure 3:
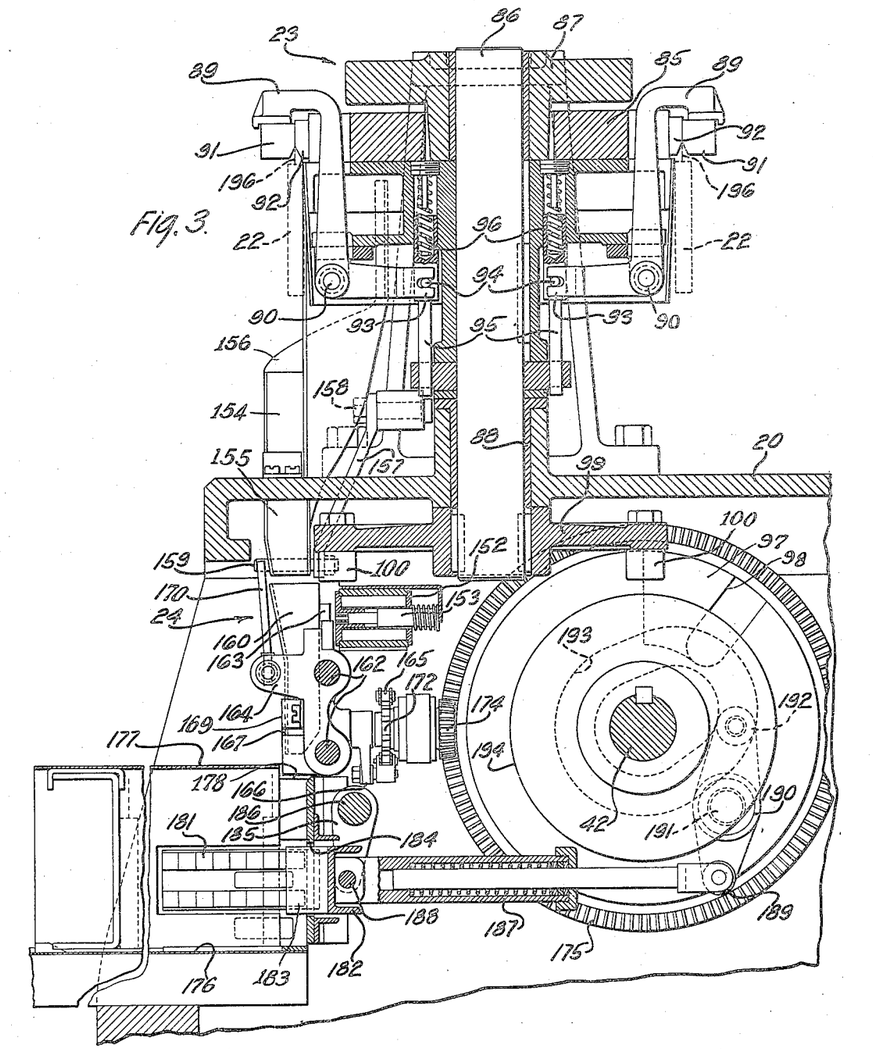
Fig. 3 is a sectional view taken along the line 3—3 of Fig. 2.

The structure employed in the capacity test is illustrated in Figs. 2, 3 and 18. The plurality of plunger actuating solenoids 152 are disposed in general alignment as shown in Fig. 18 and are provided with plungers 153 which are arranged to be moved outwardly. A receiving chute 154 has its delivering end 155 disposed at one end of the row of solenoids 152 and its receiving end 156 (Fig. 2) disposed adjacent the position 145 for receiving the condensers as they complete the capacity test. A retaining latch 157 is pivotally mounted at 158 and provided with a supporting pin 159 disposed beneath the delivering end 155 of the chute 154 for holding a condenser within the chute. A hopper 160 is movably mounted by means of a bracket 161 (Fig. 3) upon a pair of parallel guide rods 162 (Fig. 18) and is provided with a stop block 163 arranged to engage with the plungers 153 when actuated.

Motion is imparted to the hopper 160 by means of a hopper moving member 164 which is operatively connected to the chain 165 through a pivotal link 166. The hopper moving member 164 consists of a platform or a condenser resting portion 167 which is receivable in a cutaway portion 168 of the hopper 160. The hopper 160 is held in engagement with the hopper moving member 164 by a resilient retaining member 169 which has a projection adapted to engage the left hand edge of the hopper 160 as viewed in Fig. 18. Attached to and extending upwardly from the hopper moving member 164 is a releasing pin or member 170 which is arranged to be moved into engagement with the supporting pin 159 for moving the retaining latch 157 about its pivot to release the condenser in the chute 154 so that it may drop into the hopper 160 which will at that time be positioned beneath the delivering end 155 of the chute.

The chain 165 extends around sprockets 171 and 172 which are so positioned that the operative connection of the hopper moving member 164 therewith will be sufficient to move the hopper 160 from one end of the row of solenoids 152 to the other end thereof. The sprocket wheel 172 is rigidly mounted upon a shaft 173 which has disposed upon the opposite end thereof a pinion 174 (Fig. 3), the latter being meshed with a ring gear 175 which is mounted on the shaft 42.

A receiving table 176 is disposed at right angles with respect to the housing support 20 for receiving a plurality of magazines 177 in parallel relation (see Fig. 2). A plurality of spacing members 178 are disposed upon the housing 20 at spaced positions for the purpose of positioning the magazines 177 away from the housing support 20 so as to allow the condensers to pass therebetween as they are dropped from the hopper 160 and onto tracks or sliding strips 179, which are disposed in parallel arrangement and spaced positions upon the receiving table 176. The magazines 177 are so constructed that they may be disposed upon the receiving table for receiving the various classes of condensers as they are sorted. In Fig. 3 friction members 181 are shown secured to the housing 20 and disposed in spaced relation for holding the condensers in their vertical positions as they are moved into the magazines.

A means is provided for simultaneously moving any of the condensers which has been deposited by the hopper 160 into their respective magazines. This means consists of an advancing member 182 which is disposed within the housing support 20 and which carries, at spaced positions throughout the length thereof, projecting members 183 arranged to extend through apertures 184 provided therefor in the housing support. As will be observed by viewing Fig. 18 the projecting members 183 are alternately disposed between the friction members 181. The advancing member 182 (Fig. 3) is supported at each end by supporting links 185 which are, at their upper ends rigidly secured to a rocking shaft 186, the latter being journaled in the housing support 20. Movement is imparted to the advancing member 182 by a resilient cam actuated member 187 which has one end pivotally secured to the advancing members 182 and 188, and the other end pivotally secured at 189 to one end of a rocking cam lever 190. The rocking cam lever 190 is pivotally supported at 191 and has disposed upon its free end a cam roller 192 which is receivable in an eccentric cam groove 193 of a cam 194 which is rigidly mounted concentric with the shaft 42.

Figures 10, 11:
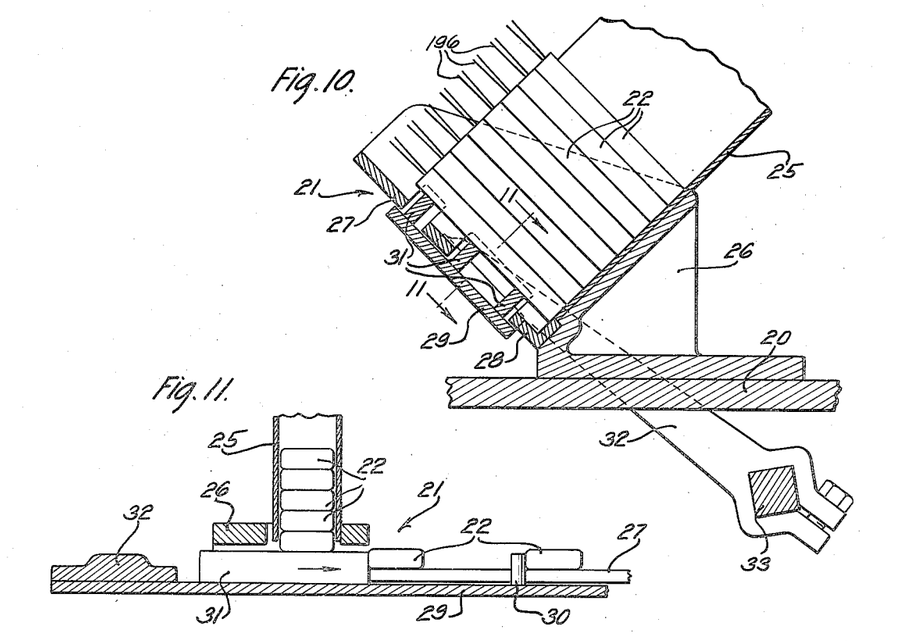
Fig. 10 is an enlarged fragmentary sectional view of the feeding mechanism taken at the feeding chute.
Fig. 11 is a sectional view taken along the line 11—11 of Fig. 10.
Figure 12:
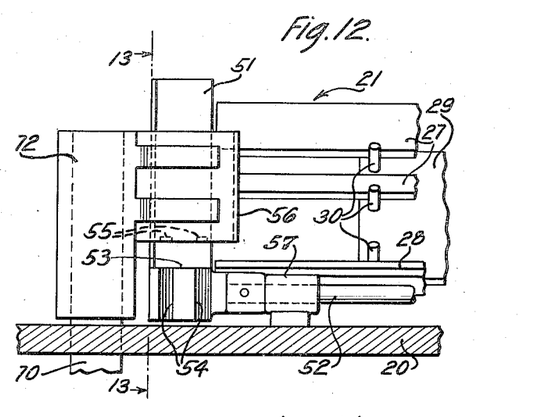
Fig. 12 is a fragmentary detailed view of the elevating mechanism showing its cooperation with the feeding mechanism.

From the foregoing description of the various parts of the device the operation thereof will be more clearly understood. The condensers 22 are disposed in the feed chute 25 in the position shown in Fig. 10, wherein the lowermost condenser rests upon the retaining strips 31 until the movable rack 29 is moved with respect to the stationary rack 27 so as to allow the lowermost condenser to rest upon the stationary rack 27 while the movable rack 29 is positioned so that the retaining members 31 will be at one side of the feed chute. At this position the cam lever 44 (Fig. 17) is actuated by the tension spring 46 for moving the rack 29 toward the elevating mechanism, thus moving the lowermost condenser a predetermined distance upon the stationary rack 27. As the lowermost condenser is moved upon the stationary rack 27 by the longitudinal movement of the movable rack 29, the remaining condensers are held against downward movement by the retaining members 31, which remain thereunder beneath until the movable rack 29 is moved downwardly or away from the stationary rack 27 due to a rotating movement of the square shaft 33 which is imparted thereto by the rotation of the rocking cam 35 with respect to the lever 34. While the movable rack 29 is in this position, away from the stationary rack 27, a reverse longitudinal movement is imparted thereto by the imparting of a similar movement to the square shaft 23 due to the rotation of the actuating cam 50 with respect to the lever 44. As the movable rack 29 completes its reverse longitudinal movement, the rocking lever 34 is released sufficiently by the roller 36 riding upon the lower portion of the cam 35 so as to allow the tension spring 195 to actuate the lever 34 and to move the rack 29 again in a position adjacent the rack 27 ready to move the next lowermost condenser which has dropped onto the rack 27, from the feed chute 25, and by the aid of the first row of condenser engaging pins 30 to move the first condenser another predetermined distance upon the stationary rack 27. This operation is continued and at the completion of each operation of the movable rack 29, a new condenser will be moved onto the stationary rack 27 ready to be fed to the elevating mechanism (Figs. 7 and 13).

During the movement of the condensers upon the stationary rack 27 the swinging or moving member 51 at the elevating mechanism is disposed adjacent the end of the rack 27 so as to receive the foremost condenser. During the downward movement of the rack 29 and its reversed movement to the position where it is to again move condensers forwardly, the swinging member 51 is moved into the vertical position as shown in Fig. 13 where the condenser carried thereby is allowed to rest upon the lifting fingers 55 of the elevating member 56 and be moved upwardly thereby to a position where the condenser will be received by the turret 23. The swinging movement of the member 51 is brought about by an upward movement of push rod 62 (Fig. 8) which is imparted thereto by the lifting cam 68 engaging with the roller 69. The upward movement of the push rod 62 causes a rocking of the shaft 60 against the tension of the spring 61 due to its engagement with the arm 66, and, by means of the operative connection, a rocking movement is imparted to the shaft 52 so as to move the swinging member 51 into its vertical position. The member 51 is held in this position for a predetermined length of time to serve as a guide for the condenser as it is moved upwardly. The member 51 is however again moved into the position adjacent the end of the stationary rack 27 in sufficient time to receive the next condenser. The upward movement of the elevating member 56 is caused by an upward movement of the vertically movable rod 70 due to its operative engagement with the cam 73.

When the condenser is moved to the uppermost position by the elevating mechanism at the loading position, the clamping lever 89, which has been previously moved outwardly, will be released, thus allowing the spring 96 thereof to move the insulating block 91 into close engagement with the terminals 196 of the condenser so as to firmly hold the terminals in close engagement with the separate contact blocks 92. In this manner the condensers are fed to the testing unit 23 at each intermittent movement thereof.

During the intermittent movement of the testing unit or turret 23 the condenser being tested is first brought in contact with the breakdown circuit, wherein a potential of 500 volts is applied to the condenser at the position 108. At the completion of the next intermittent movement of the turret the condenser will be positioned at 113 where the repair voltage will be intermittently applied thereto. If the condenser withstands the test submitted to it at position 108 or has been repaired at position 113, it is passed on to the position 125 where it is discharged through the discharge circuit. However, if the condenser does not withstand the test submitted to it at positions 108 and 113 the solenoid 122 is energized, thus moving the knockout cam 123 (Fig. 7) in the path of the knockout rod 95 (Fig. 3) so as to actuate the clamping lever 89, during the next intermittent movement of the turret, and release the rejected condenser allowing it to pass downwardly through a discharge chute 210 to any suitable receiving means (not shown).

A condenser, which has stood the test applied to it at positions 108 and 113, will discharge the 500 volts at 125 and move to position 131 where it will receive an insulation resistance test by applying a charge of 110 volts thereto. After the application of this charge the condenser is allowed a predetermined length of time for leakage during its movement from position 131 through positions 135 and 136 to position 137. If there has been a leakage in the condenser during this length of time, a leakage sufficient to allow the submission of 110 volts to energize a relay 138, the solenoid 140 will be energized, thus actuating the knockout cam 141 so as to move it in the path of the knockout rods 95 and release the rejected condenser by the movement of the clamping lever 89 which held the condenser during the previous tests. The rejected condenser will pass through a chute into a receptacle (not shown). However, if the condenser withstands the insulation resistance test, it is moved to the position 144 where it will be connected to the discharge circuit for discharging its charge.

Figure 6:
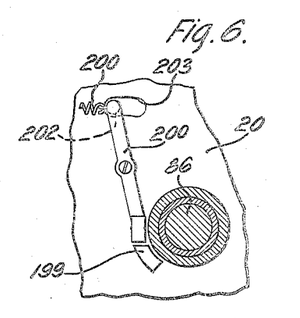
Fig. 6 is a sectional view taken along the line 6—6 of Fig. 5.

The condenser is next submitted to a capacity test at the position 145, at which position a circuit is completed including the condenser and causes a current of 90 volts to be applied to the microfarad meter 146. The pointer 147 of the meter will be deflected, dependent upon the capacitance of the condenser and while in this position it is moved by the contactor 150, which is actuated by the relay 149 in the circuit 148 into contact with the alined segment 151. The closing of the adjacent circuit by the engagement of the pointer 147 with the alined segment 151 energizes a relay 197 which closes a double switch 198 for closing a circuit and allowing a current passing therethrough to energize the solenoid 152, thus moving the plunger 153 outwardly which is carried thereby. As soon as the relay 197 is energized for closing the switch 198 the pointer 147 will be released to register properly for the next condenser. After the proper plunger has been moved outwardly, the knockout rod 95 of the lever 89, which has gripped the condenser during its movement in the testing unit, will be raised as it moves upon the stationary cam 199 (Fig. 6), thus releasing the condenser and allowing it to drop into the chute 154 where it will rest upon the supporting pin 159 until the supporting pin is moved from beneath the condenser, allowing the condenser to drop into the hopper 160, which will at that time be disposed beneath the chute 154. As the hopper 160 is moved away from the chute 154 by the hopper moving member 164, the stop member 163 which is carried by the hopper will engage with the plunger 153 which has been moved outwardly, thus stopping the movement of the hopper and allowing the hopper moving member 164 to continue in its movement due to its operative engagement with the chain 165. The movement of the hopper moving member relative to the hopper will allow the condenser, which has been disposed in the hopper, to drop therefrom between the adjacent spacing members 178 and upon the adjacent track 179. Upon the return movement of the hopper moving member 164 engagement will again be made with the hopper and in this manner the hopper will be moved to the position beneath the delivering end 155 of the chute 154. During this movement of the hopper beneath the chute, the releasing member 170 will engage with the supporting pin 159 and actuate the lever 157 so as to release the condenser which has been disposed in the chute 152 allowing it to drop into the hopper 160 and rest upon the portion 167 of the hopper moving member 164. The releasing of the condenser and the passing of the condenser, by gravity, into the hopper takes place while the outer end of the pivotal link 166 is swung about the periphery of the sprocket wheel 171 so that it will be with the upper portion of the chain so as to move the hopper and the hopper moving member away from the chute 154. The hopper is moved by the hopper moving member until the stop 163 engages with the plunger 153 of the solenoid which has been energized as a result of the capacity of the condenser which is being delivered, thus stopping the movement of the hopper and allowing the hopper moving member to continue in its movement so as to release the condenser.

In Fig. 18 the hopper 160 is illustrated as having stopped at the fifth solenoid, but it is obvious that with the hopper moving mechanism the hopper may be moved to and stopped at any of the desired positions so as to drop the tested condenser within any of the compartments provided. The hopper 160 is returned to the receiving position beneath the chute 154 by the connection of the pivotal link 166 with the chain 165 moving around the outer periphery of the sprocket and moving with the lower portion of the chain to cause the hopper moving member 164 to move from right to left on the rods 162 as viewed in Fig. 18, and move the hopper 160 to a position beneath the chute 154 to receive the next condenser. The pivotal link 166, in moving from the lower portion of the upper portion of the chain 165, allows the carriage 164 to stop for an instant to allow for the discharge of the condenser into the hopper 160 but movement of the hopper moving member 164, which is now latched to the hopper 160 through the projection on the resilient member 169, is effected when the pivotal link 166 is in engagement with the upper portion of the chain 165. The hopper 160 containing the condenser, and the hopper moving member 164 are thus moved with the upper portion of the chain 165 until the hopper is stopped in its movement by the actuated plunger 153, allowing the hopper moving member 164 to move away from the hopper and to continue its movement with the upper portion of the chain, and thus release the condenser from the hopper, allowing it to drop into the alined compartment. The hopper moving member 164 continues in its movement to the right, rests at its farthest position while the connection of the pivotal link is swung around the outer periphery of the sprocket wheel 172 to the lower portion of the chain 165 and is again moved to the left.

Upon the return movement of the hopper moving member 164 after the condenser has been dropped in the compartment provided therefor, the advancing member 182 is moved outwardly due to its operative engagement through the lever 190 to the eccentric cam groove 193. The outward movement of the advancing member 182 causes the projecting members 183 to move the deposited condensers into their respective magazines 177 relative to the friction members 181. In this manner the deposited condensers are moved out of the way so as to allow space for condensers which are next to be deposited.

Figure 5:
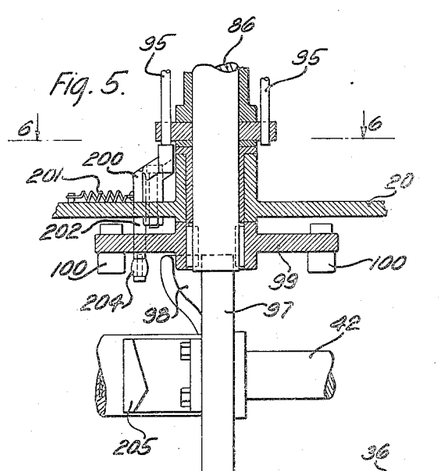
Fig. 5 is a fragmentary detailed sectional view of the intermittent moving mechanism for the testing unit.

The description of the operation of this apparatus has followed one condenser through the feeding mechanism, the elevating mechanism, the testing unit, and the sorting mechanism. After the condenser is released and allowed to pass into the chute 154 at the position 145, the knockout rod of the lever 89 which has held the condenser in the testing unit, will be moved upwardly upon a stationary cam 199 and onto one end of a releasing lever 200. The lever 200 which is normally held in a position shown in Figs. 5 and 6 by means of a spring 201, is provided with an arm 202 which extends downwardly through an aperture 203 in the support 20 and has disposed upon the free end thereof a cam roller 204 which is arranged to be engaged by a releasing cam 205 disposed upon the cam 97 at the periphery thereof. With this construction the lever, which has been moved outwardly by the cam 199, and has been held in this position by the adjacent end of the lever 200, will be released so as to allow the insulating block 91 thereof to be moved inwardly to hold the terminals of a condenser, which has been moved upwardly into the loading position, in close engagement with the contact blocks 92. In this manner a new condenser is disposed in the testing unit at each intermittent movement thereof.

For the purpose of determining whether or not the proper tests are applied to the condensers an indicating lamp 206 is disposed in the breakdown circuit, an indicating lamp 207 is disposed in the sorting circuit, and an indicating lamp 208 is disposed in the circuit with the relays at 197. An indicating meter 209 is disposed in the insulation resistance circuit as shown in Fig. 19. By the aid of the indicating lamps 206, 207, and 208 the operator may readily observe whether or not the breakdown test is applied to the condensers, whether or not sorting means is functioning properly, and whether or not the cooperating relays 197 are being energized. The indicating meter 209 is for visually indicating whether or not the insulation resistance test is applied to the condensers. Without these indicating lamps and the indicating meter the operator could not determine whether or not the apparatus was functioning properly.

It is obvious that after the condensers have been disposed in the feeding mechanism, they are automatically moved toward the elevating mechanism and are so timed in their movement, that, as soon as the swinging member 151 is disposed adjacent the end of the rack 27, a condenser will be moved thereupon and swung into engagement with the lifting or elevating member 56 so that it may be raised thereby into the position to be gripped by one of the clamping levers 89. It will also be observed that the intermittent movement of the testing unit 23 is so governed that one of the clamping levers 89 will be swung outwardly so as to allow the terminals of the condenser which is being raised to pass between the insulating block 91 and the adjacent contact blocks 92. These movements are also automatic and require no assistance of the operator. Another of the outstanding features of this invention is the provision of the means for automatically subjecting to the condensers the breakdown test, the repair voltage, the insulation resistance test, without releasing the condensers unless they are rejected after any of the tests have been submitted thereto, and sorting the condensers relative to their capacity value. Still another feature of this invention lies in the means for automatically discharging the rejected condensers before they pass to the last stage of the testing unit; namely, the sorting of the condensers according to the value of their capacity.

Although a specific form of apparatus has been disclosed as exemplifying the embodiment of the invention, it is understood that other forms of apparatus might be used without departing from the spirit and scope of the present invention.

What is claimed is:

1. In an apparatus for sorting condensers, means for measuring the capacity of the condensers to determine in which range of a plurality of ranges of capacity each falls, control means connected to said measuring means for energization thereby, and means controlled by said control means for sorting the condensers according to the measure of their capacity, comprising means for selecting and discharging into one group condensers having capacities lying within certain predetermined finite limits and cooperating means for selecting and discharging in another group condensers having capacities lying within certain other predetermined finite limits.

2. In an apparatus for testing and sorting condensers, a movable member, means for imparting an intermittent movement to said movable member, means carried by said movable member for gripping terminals of a condenser at each intermittent movement of said movable member, means for subjecting the condenser to a predetermined voltage, and means actuated resultant of the subjection of the condenser to said voltage for actuating said gripping means to release the condenser.

3. In an apparatus for testing and sorting condensers, means for receiving the condensers, means for removing the condensers singly from said condenser receiving means, means for imparting intermittent movement to the removed condensers, terminal gripping members for gripping the terminals of the condensers, means for disposing the condensers adjacent said gripping members whereby the terminals of the condenser may be engaged by said gripping members, and means responsive to the condition of the condensers for sorting the condensers.

4. In an apparatus for testing and sorting condensers, a rack, means for disposing condensers having terminals upon said rack, means for moving the condensers intermittently upon said rack, a terminal gripping member, and means for receiving the condensers for moving the condensers relative to said gripping member whereby the terminals of the condensers may be gripped thereby.

5. In an apparatus for testing and sorting condensers, a movable member, gripping members carried by said movable member, means for imparting an intermittent motion to said movable member, means actuated at each intermittent movement of said movable member for actuating one of said gripping members for gripping terminals of a condenser, means for testing the condenser, and means responsive to the results of said tests for actuating said gripping members for releasing the condenser.

6. In an apparatus for testing and sorting condensers, a movable member, gripping members carried by said movable member, means for imparting an intermittent motion to said movable member, means actuated at each intermittent movement of said movable member for actuating one of said gripping members for gripping terminals of a condenser, means for testing the condensers, means for actuating said gripping members for releasing the condensers, means for sorting the released condensers relative to the test thereof, a hopper for receiving the released condensers, means for imparting movement to said hopper, and means governed by the measure of capacity of the condensers for stopping the movement of said hopper for sorting the condensers.

7. In an apparatus for testing and sorting condensers, means for testing the condensers, a chute for receiving the condensers when tested, means for retaining the condensers in said chute, a hopper, means for moving said hopper beneath said chute, means for actuating said retaining means for releasing the condenser for allowing the condenser to pass into said hopper, means for moving said hopper, and means for separating said hopper from said hopper moving means for discharging the condenser at a position resultant of said test.

8. In an apparatus for testing and sorting condensers, means for testing the condensers, a platform for receiving the condensers, means responsive to said testing means for sorting the condensers and depositing the condensers upon said platform in positions relative to the test of the condenser, magazines positioned relative to said platform to receive the sorted condensers, means for moving the condensers into said magazines, and means for retaining the condensers in stacked formation as said moving means moves the condensers into said magazines.

9. In an apparatus for testing condensers, a testing unit, means for advancing condensers, an elevating member, means movable from said condenser advancing means to said elevating member for receiving a condenser from said advancing means and positioning the condenser upon said elevating member, and means for moving said elevating member vertically for moving the condenser thereupon into registration with said testing unit.

10. In an apparatus for testing condensers, a testing unit, means for supplying condensers successively to said testing unit comprising a rack, means for advancing the condensers upon said rack, an elevating member movable toward said testing unit, a transferring member arranged to receive the condensers successively from said rack and move the condensers upon said elevating member, and means for moving said elevating member vertically to successively move the condensers into registration with said testing unit.

11. In an apparatus for testing condensers, a testing unit, and means for supplying condensers successively to said testing unit comprising a reciprocable elevating member for moving condensers successively into registration with said testing unit, a rack for receiving condensers, means for moving the condensers intermittently upon said rack, and an oscillating tray synchronized in its movement with said condenser moving means for receiving condensers successively from said rack and moving the condensers upon said elevating member.

12. In an apparatus for testing condensers, a testing unit, means for supplying condensers successively to said testing unit comprising a rack for receiving the condensers, means for moving the condensers intermittently upon said rack, a transferring member for receiving the condensers successively from said rack, an elevating member, means for actuating said transferring member for moving the condensers successively onto said elevating member and for guiding the movement of the condensers during movement of said elevating member, and means for actuating said elevating member for successively moving the condensers vertically to said testing unit.

13. In an apparatus for testing condensers, a testing unit having a plurality of sets of contact members, a plurality of insulating members arranged to be moved toward and away from said contact members, means for imparting an intermittent movement to said testing unit, means for supplying condensers having terminals to said testing unit, means for moving one of the insulating members away from its respective set of contact members after each intermittent movement of said testing unit for receiving the terminals of a condenser between said insulating member and its adjacent set of contact members, and means for moving said insulating member toward the adjacent set of contact members for forcing the terminals of the condenser in close engagement therewith.

14. In an apparatus for testing condensers, a testing unit, means carried by said testing unit for gripping the terminals of a condenser, means for imparting intermittent movement to said testing unit, means whereby an electrical circuit may be completed through the condenser during the intermittent movement of said testing unit for subjecting the condenser to a voltage breakdown test, means whereby another electrical circuit may be completed after another intermittent movement of said testing unit for subjecting the condenser to a repair voltage, and means resultant of said last named means for releasing the condenser from said terminal gripping means.

15. In an apparatus for testing condensers, a testing unit, means carried by said testing unit for gripping the terminals of a condenser, means for imparting intermittent movement to said testing unit, means whereby an electrical circuit may be completed through the condenser during the intermittent movement of said testing unit for subjecting the condenser to a voltage breakdown test, means whereby another electrical circuit may be completed after another intermittent movement of said testing unit for subjecting the condenser to a repair voltage, said terminal gripping means continuing to grip the terminals of the condenser if the condenser withstands the voltage breakdown test and the repair voltage test, and means for releasing the condenser from said terminal gripping means if the condenser fails to withstand said tests.

16. In an apparatus for testing condensers, a testing unit, terminal gripping means carried by said testing unit for gripping the terminals of a condenser, means for applying a potential of predetermined voltage to the condenser, means for subjecting the condenser to an insulation resistance test, and means controlled by the result of said test for releasing said terminal gripping means for discarding the condenser.

17. In an apparatus for testing condensers, a testing unit, terminal gripping means carried by said testing unit for gripping the terminals of a condenser, means for applying a potential of predetermined voltage to the condenser, means for subjecting the condenser to an insulation resistance test, said terminal gripping means remaining effective for gripping the terminals of the condenser if the condenser withstands said insulation resistance test, and means affected if the condenser fails to withstand said insulation resistance test for actuating said terminal gripping means for releasing the condenser.

18. In an apparatus for testing condensers, a testing unit, terminal gripping members carried by said testing unit for gripping the terminals of condensers, means for measuring the capacity of the condensers to determine in which range of a plurality of ranges of capacity each falls while the terminals are gripped by said terminal gripping members, control means connected to said measuring means for energization thereby, and means controlled by said control means for sorting the condensers according to the capacity measurement thereof into at least three groups having mutually exclusive values of capacity.

19. In an apparatus for testing condensers, a testing unit, terminal gripping members carried by said testing unit for gripping terminals of condensers, a plurality of compartments, means for measuring the capacity of said condensers to determine in which range of a plurality of ranges of capacity each falls while the terminals are gripped by said terminal gripping means, control means connected to said measuring means for energization thereby, and means controlled by said control means for sorting the condensers into said compartments in accordance with their capacity measurement into at least three groups having mutually exclusive values of capacity.

20. In an apparatus for testing condensers, a plurality of compartments, a hopper disposed adjacent said compartments, means for moving said hopper into general alignment with any one of said compartments, means for successively measuring the capacity of said condensers, means for successively depositing the condensers in said hopper, and means for stopping the movement of said hopper in general alignment with one of the compartments depending upon the capacity measurement of the condenser disposed in said hopper for releasing the condenser from the hopper and allowing it to be disposed in the adjacent compartment.

21. In an apparatus for testing condensers, means for successively measuring the capacity of condensers, a plurality of compartments, a plurality of stop members positioned in general alignment with said compartments, means for receiving the condensers, means for moving said condenser receiving means relative to said compartments, and means effected by said capacity measuring means for actuating one of said stop members depending upon the capacity of the condenser in said condenser receiving means for stopping the movement of said condenser receiving means adjacent one of said compartments for allowing the condenser to be deposited therein.

22. In an apparatus for testing condensers, means for measuring the capacity of the condensers, a chute for successively receiving the condensers, a hopper movable toward and away from said chute, means for moving said hopper beneath and away from said chute for receiving the condensers therefrom, a plurality of compartments for receiving the condensers in accordance with their capacity measurements, and means affected by the measurement of the capacity of said condensers for stopping the movement of said hopper in alignment with one of the compartments depending upon the capacity measurement of the condenser contained therein.

23. In an apparatus for testing condensers, a testing unit, terminal gripping members for gripping the terminals of condensers carried by said testing unit, means for successively completing electrical circuits for subjecting the condensers to a voltage breakdown test, a repair voltage test, an insulation resistance testing means, a capacity measurement testing means, means for rejecting condensers which fail to withstand said tests, and means for sorting the condensers in accordance with their capacity measurement.

24. In an apparatus for testing condensers, an indicating member having a pointer actuated responsive to the measure of capacity of condensers, means for charging the condensers, means for successively moving the condensers into electrical engagement with said indicating member whereby electrical energy discharged by the condensers will cause a movement of the pointer proportional to the amount of energy, and means controlled by the extent of movement of the pointer for sorting the condensers according to the measure of their capacity.

25. In an apparatus for testing condensers, an indicating member having a pointer actuated responsive to the measure of capacity of condensers, means for charging and successively moving the condensers into electrical engagement with said indicating member whereby electrical energy constituting the measure of capacity of each condenser will cause a movement of the pointer, a plurality of contacts positioned to be engaged by the pointer, and a sorting means associated with each contact whereby a predetermined one of said sorting means may be selectively energized by the engagement of the pointer with one of the contacts.

26. In an apparatus for testing condensers, an indicating member having a pointer actuated responsive to the measure of capacity of condensers, means for charging and successively moving the condensers into electrical engagement with said indicating member whereby electrical energy constituting the measure of capacity of each condenser will cause a movement of the pointer, a plurality of contacts positioned to be engaged by the pointer, a sorting means associated with each contact whereby a predetermined one of said sorting means may be selectively energized by the engagement of the pointer with one of the contacts, and means for moving the pointer into engagement with one of the contacts.

27. In an apparatus for testing electrostatic condensers, means for charging a condenser by subjecting it to an electrical current of predetermined voltage, means for thereafter disposing the condenser in an electrical circuit of predetermined electrical energy, and means electrically connected in said circuit and rendered effective by electrical energy escaping through the condenser for rejecting the condenser should the condenser be defective.

28. In an apparatus for testing electrostatic condensers, means for holding a condenser, means for moving said holding means for moving the condenser from one position to another, means for charging the condenser while at one position by subjecting it to an electrical current of predetermined voltage, means for disposing the condenser in an electrical circuit of predetermined electrical energy while at another position, and means connected in said circuit and rendered effective by a predetermined leakage of electrical energy through the condenser should the condenser be defective for rejecting the condenser from said holding means.

29. In an apparatus for testing electrostatic condensers, means for charging a condenser by subjecting it to an electrical current of predetermined voltage, means for testing the condenser after a predetermined interval of time, and means for rejecting the condenser if there has been a leakage of electrical energy from the condenser.

30. In an apparatus for testing electrostatic condensers, means for subjecting a condenser to an insulation resistance test comprising means for charging a condenser by subjecting it to an electrical current of predetermined voltage, mean for testing the condenser after a predetermined interval of time, and means rendered effective by said testing means for rejecting the condenser if defective.

31. In an apparatus for testing condensers, means for gripping condenser terminals, said means including an electrical contact, means for feeding condensers, and means for elevating a condenser from said feeding means to a position where its terminals may be seized by said gripping means, said elevating means being arranged to be retracted so that said condenser is supported solely by its terminals during a test.

32. In an apparatus for testing condensers, advancing means for conveying condensers to a plurality of test positions, gripping members on said advancing means, each including an electrical contact, for engaging the terminals of a condenser, said condensers being solely supported by their terminals and depending therefrom during the motion of said advancing means, means at one of said test positions for testing an electrical characteristic of a condenser, and means responsive to said testing means for actuating said gripping member to discard said condenser.

33. In an apparatus for testing condensers, means for gripping the terminal of a condenser, means for feeding condensers in prone positions, means at the end of said feeding means for moving a condenser from said prone position to a vertical position, and means for elevating said condenser to a position where its terminal may be seized by said gripping means.

34. In a condenser testing machine, a conveyor having pairs of conductive elements at spaced intervals, means for moving said conveyor, means operable in timed relation with said conveyor for feeding condensers and attaching the terminals thereof to said conductive elements, a device for testing a characteristic of the dielectric material in the condensers and having a pair of terminals engaging said pairs of conductive elements successively, a device for testing the capacity of the condensers and having a pair of terminals engaging said conductive elements subsequent to said first testing device, and means responsive to the action of said first testing device for removing defective condensers before they arrive at the terminals of said capacity measuring device.

35. In an apparatus for testing and sorting condensers, means for testing the condensers, means for moving the condensers successively to said testing means, means for rejecting the condensers which fail to withstand said test, means for measuring the capacity of the accepted condensers to determine in which range of a plurality of ranges of capacity they fall, said moving means being arranged to move the accepted condensers to said capacity testing means, and means controlled by said capacity measuring means for sorting the accepted condensers into a plurality of groups of known capacity.

36. In a condenser measuring and sorting machine, a capacity measuring device, means for automatically conveying condensers to said device and connecting them thereto, said device comprising a movable member and means for moving said member a distance depending on the capacity of the particular condenser connected to the device, and means controlled by said movable member for depositing the condensers in a plurality of groups, each group comprising only condensers having capacities corresponding to a respective position of said movable member.

37. In an apparatus for testing and classifying condensers, means for subjecting the condensers to a voltage breakdown, an insulation resistance and capacity test, means for feeding a condenser to said testing means to undergo said tests in sequence, means responsive to the first two of said tests for discharging the condensers failing to withstand said tests, and means responsive to the capacity testing means for sorting according to capacity the condensers surviving the first two tests.

CHESTER A. PURDY.